(12) United States Patent
Corson

(10) Patent No.: US 8,164,566 B2
(45) Date of Patent: *Apr. 24, 2012

(54) REMOTE INPUT DEVICE

(75) Inventor: Gregory A. Corson, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 400 days.

This patent is subject to a terminal disclaimer.

(21) Appl. No.: 12/436,668

(22) Filed: May 6, 2009

(65) Prior Publication Data

US 2009/0213072 A1 Aug. 27, 2009

Related U.S. Application Data

(63) Continuation of application No. 11/139,254, filed on May 27, 2005, now Pat. No. 7,548,230.

(51) Int. Cl.
*G09G 5/08* (2006.01)

(52) U.S. Cl. ......... 345/158; 345/156; 345/157; 353/121

(58) Field of Classification Search .................. 353/121; 340/825; 356/614

See application file for complete search history.

(56) References Cited

U.S. PATENT DOCUMENTS

| | | | |
|---|---|---|---|
| 4,787,051 A | 11/1988 | Olson | |
| 4,843,568 A | 6/1989 | Krueger | |
| 5,128,671 A | 7/1992 | Thomas, Jr. | |
| 5,528,265 A | 6/1996 | Harrison | |
| 5,554,980 A | 9/1996 | Hashimoto et al. | |
| 6,157,368 A | 12/2000 | Faeger | |
| 6,184,863 B1 | 2/2001 | Sibert et al. | |
| 6,346,933 B1 | 2/2002 | Lin | |
| 6,375,572 B1 | 4/2002 | Masuyama | |
| 6,377,242 B1 | 4/2002 | Sweed | |
| 6,424,410 B1 | 7/2002 | Pelosi | |

(Continued)

FOREIGN PATENT DOCUMENTS

WO  WO 2008/056180 A2  5/2008

OTHER PUBLICATIONS

Bolt, R.A., "Put-that-there": voice and gesture at the graphics interface, Computer Graphics, vol. 14, No. 3 (ACM SIGGRAPH Conference Proceedings) Jul. 1980, pp. 262-270.

(Continued)

*Primary Examiner* — Amare Mengistu
*Assistant Examiner* — Premal Patel
(74) *Attorney, Agent, or Firm* — Kilpatrick Townsend & Stockton LLP

(57) ABSTRACT

An input device providing users with a pointing capability includes a sender portion and a receiver portion. The sender portion is adapted to be manipulated by a user to specify a target point within a target area. The sender portion projects a light beam including a pattern on to the target area. A receiver portion includes one or more sensor units located in or near the target area. At least some of the sensor units receive a portion of the light beam regardless of the location of the target point within the target area. A processing unit in the receiver portion analyzes the portions of the light beam received by one or more sensor units to determine an attribute of the target point. The attribute can be the location or relative motion of the target point. The receiver portion may be integrated with a display device.

20 Claims, 8 Drawing Sheets

U.S. PATENT DOCUMENTS

| | | |
|---|---|---|
| 6,501,515 B1 | 12/2002 | Iwamura |
| 6,654,008 B2 | 11/2003 | Ikeda et al. |
| 7,346,837 B2 | 3/2008 | Shimizu |
| 7,359,564 B2 | 4/2008 | Keam et al. |
| 7,405,726 B2 | 7/2008 | Pelosi |
| 7,499,027 B2 * | 3/2009 | Brigham et al. .............. 345/158 |
| 2001/0045940 A1 | 11/2001 | Hansen |
| 2002/0080195 A1 | 6/2002 | Carlson et al. |
| 2002/0085097 A1 | 7/2002 | Colmenarez et al. |
| 2003/0107748 A1 | 6/2003 | Lee |
| 2003/0136844 A1 | 7/2003 | Dvorkis |
| 2004/0070564 A1 | 4/2004 | Dawson et al. |
| 2004/0075646 A1 | 4/2004 | Waters |
| 2004/0212589 A1 | 10/2004 | Hall et al. |
| 2004/0213419 A1 | 10/2004 | Varma et al. |
| 2006/0277571 A1 | 12/2006 | Marks et al. |
| 2007/0109267 A1 * | 5/2007 | Guo et al. .................... 345/166 |
| 2008/0094353 A1 | 4/2008 | Marks |

OTHER PUBLICATIONS

DeWitt, Thomas and Edelstein, Phil, "Pantomation: A System for Position Tracking," Proceedings of the 2nd Symposium on Small Computers in the Arts, Oct. 1982, pp. 61-69.

* cited by examiner

REMOTE INPUT DEVICE

CROSS-REFERENCE TO RELATED APPLICATIONS

This application is a continuation of prior application Ser. No. 11/139,254 filed May 27, 2005, hereby incorporated by reference in its entirety for all purposes.

This application is related to application Ser. No. 12/513,359 filed May 1, 2009, which is the National Stage of International Application No. PCT/US06/20658, filed May 26, 2006, which claims priority to U.S. application Ser. No. 11/139,254 filed May 27, 2005 (the parent of this application as shown above).

BACKGROUND OF THE INVENTION

The invention relates to the field of input devices suitable for operating display devices and other electronic devices. Many consumer electronics devices, such as televisions, video playback and recording devices, and cable boxes, have numerous complicated and esoteric functions that need to be controlled by a user from a distance. Some manufacturers provide users with complicated remote controls that include dedicated buttons for all of the device's functions. However, complicated remote controls are expensive and discourage casual users from operating the equipment.

As an alternative, the user interfaces for many consumer electronic devices employ on-screen displays to enable users to control many device functions. The on-screen display provides users with a graphical user interface. One type of graphical user interface is a menu-based user interface. Menu-based interfaces group functions together under one or more nested menus. User can move between menus using a joystick or directional pad included in the remote control. However, because menu-based interfaces often bury functions under one or more menus or sub-menus, they are often difficult to use. Additionally, users must often input numerous button presses to navigate to and select the desired menu item.

Pointer-based graphical user interfaces are widely employed to operate computers. Typically, users manipulate an on-screen pointer using a mouse to interact with the graphical user interface. Pointer-based graphical user interfaces allow users to view and manipulate icons for a large number of functions with relative ease. A mouse typically requires a flat, smooth surface to operate correctly. In office environments, where users are typically seated at a desk, a mouse is an effective input device.

However, in many applications, the user does not have access to a flat surface. In these applications, a mouse is difficult and inconvenient to use. In an example, a user standing and giving a presentation must often return to a podium, table, or other flat surface to manipulate a mouse. In another example, in home entertainment environment, a user is often seated or lying down on a sofa or reclining chair. In this environment, the user would often have to change position to operate a mouse. As a result of this disruption, mice are not widely used in casual environments where the user is not likely to be seated in front of a flat surface.

To implement a pointer-based user interface in consumer electronics devices, some remote controls for consumer electronics devices include a digital or analog joystick to control an on-screen pointer of a pointer-based on-screen display. Unfortunately, users often find controlling a pointer using a joystick to be difficult, non-intuitive, and frustrating.

Other types of input devices have been developed to provide users with more intuitive ways of directing an on-screen pointer. One of these types of devices is the light gun or light pen. Light guns and light pens typically determine a pointer location by measuring the timing of a raster-scan based display. As a result, these types of devices cannot operate from non-raster scanned displays, such as LCD, plasma, and non-CRT based projection displays. Another type of light gun projects a narrow infrared beam at a target point. A camera located behind the user detects beam and deduces the position of the target point. This type of light gun is complicated and expensive, requiring the installation of a camera on the opposite wall from the target display.

Another type of remote input device is the Gyromouse, made by Gyration Inc. The Gyromouse includes one or more solid-state gyroscopes adapted to sense movement. As the user manipulates this device, the gyroscopes detect the motion and send a signal, often via radio waves, to a receiver unit. The receiver unit then interprets this signal into a pointer movement. The disadvantages of this device are its complexity, cost, size, and power consumption. Moreover, this type of device is often only sensitive to large amounts of motion. Thus, users must move the device substantially to operate the pointer.

It is therefore desirable for input device to provide users with an intuitive pointing capability. It is further desirable that the input device be capable of operating in free space, rather than requiring a flat surface. It is also desirable for the input device to be inexpensive to manufacture, provide long battery life, and to work with a variety of different types of displays. It is additionally desirable for the input device to be easily integrated with a variety of devices, including consumer electronic devices such a televisions, DVD players and recorders, digital or personal video recorders, cable and satellite set-top boxes, and video game consoles.

BRIEF SUMMARY OF THE INVENTION

An embodiment of the invention is an input device that provides users with a pointing capability. This embodiment includes a sender portion and a receiver portion. The sender portion is adapted to be manipulated by a user to specify a target point within a target area. The sender portion projects a light beam including a pattern on to the target area. A receiver portion includes one or more sensor units located in or near the target area. At least some of the sensor units receive a portion of the light beam regardless of the location of the target point within the target area. A processing unit in the receiver portion analyzes the portions of the light beam received by one or more sensor units to determine an attribute of the target point. The attribute can be the location or relative motion of the target point. The receiver portion may be integrated with a display device.

In an embodiment, a system for providing a positional input value to an electronic device includes a sender portion adapted to be manipulated by a user to specify a target point within a target area. The sender portion includes a light projecting system adapted to project a beam of light including a predefined spatially varying characteristic at the target area. The system also includes a receiver portion including at least one sensor unit. The sensor unit is adapted to measure at least one value of the spatially varying characteristic of the beam of light at the location of the sensor unit. The receiver portion includes logic adapted to determine a positional input value associated with the target point from the value of the spatially varying characteristic at the location of the sensor unit.

In a further embodiment, the light projecting system is adapted to disperse the beam of light such that at least a portion of the beam light is received by at least one sensor unit of the receiver portion regardless of the location of the target point within the target area.

In another embodiment, the predefined spatially varying characteristic of the beam of light is an intensity pattern. Additionally, the sensor unit is part of a plurality of sensor units. Each sensor unit is at a different location and is adapted to measure the value of the spatially varying characteristic of the beam of light at its respective location. The value of the spatially varying characteristic is an intensity of light received from the sender portion. The receiver portion includes logic adapted to determine the positional input value associated with the target point from intensity of the beam of light measured by the plurality of sensor unit locations. The positional input value can be an absolute or relative position of the target point.

In another embodiment, the predefined spatially varying characteristic of the beam of light is a pattern including a plurality of intensity transitions adapted to indicate motion of the target point. Example patterns include a plurality of concentric circles and a plurality of speckles. In a further embodiment, the sensor unit includes a plurality of sensors arranged to detect a direction of pattern motion along at least one axis. The receiver portion includes logic adapted to compare changes in intensity received by each sensor over time to determine a direction and magnitude of pattern motion. The positional input value can be a relative motion of the target point, as measured by the pattern motion.

BRIEF DESCRIPTION OF THE DRAWINGS

The invention will be described with reference to the drawings, in which.

In the drawings, the use of identical reference numbers indicates similar elements.

DETAILED DESCRIPTION OF THE INVENTION

Figure 1:
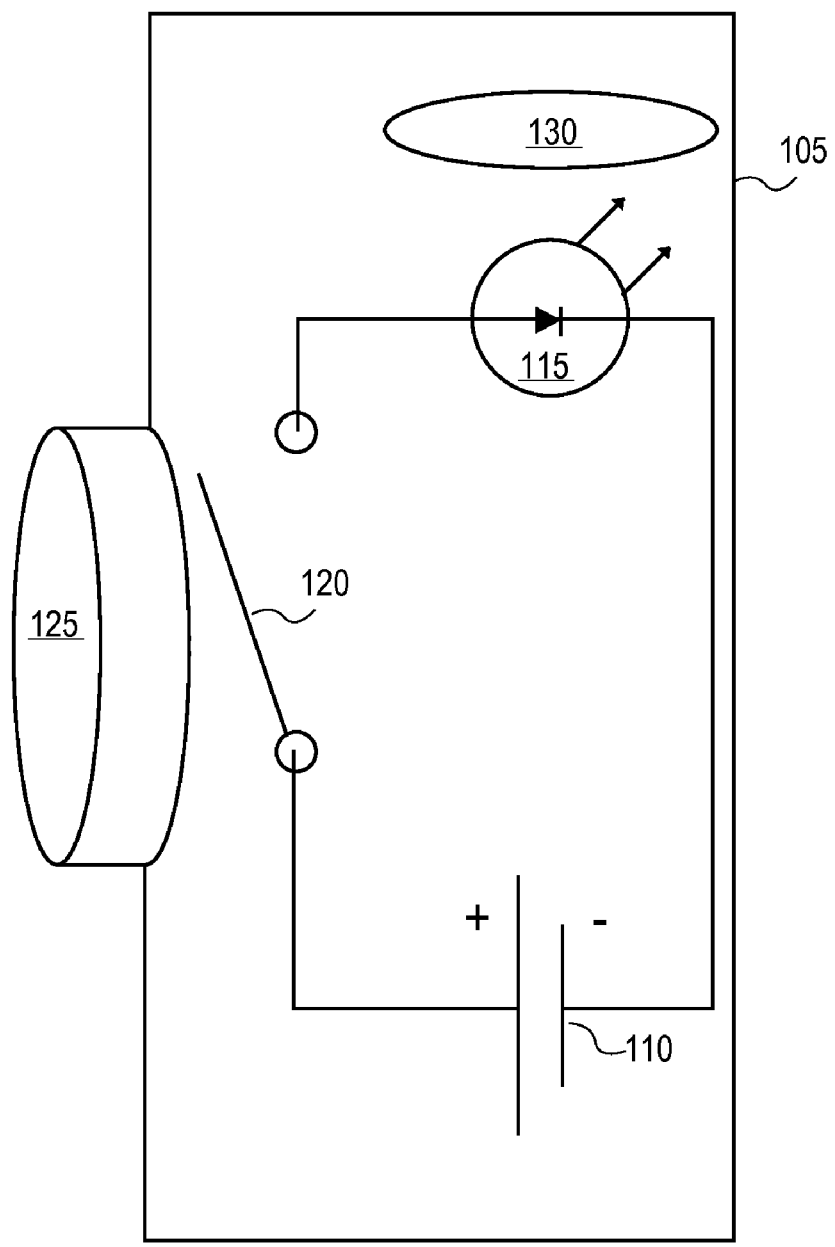
FIG. 1 illustrates a sender portion of an embodiment of the invention.

FIG. 1 illustrates a sender portion 100 of an embodiment of the invention. The sender portion 100 is adapted to be manipulated by a user. The user points the sender portion 100 at a target area to specify a target point. The position of the target point manipulates a pointer or other user interface element. In an embodiment, the target point is within the boundaries of a target area. An example target area is the screen of a display device, such as a television. In further embodiments, discussed below, the sender portion 100 allows the user to specify an absolute location for a pointer or user interface element and/or a relative movement of a pointer or user interface element from a previous location.

Sender portion 100 includes a housing 105, a battery or other power supply 110, and a light source 115. Light source 115 can emit visible or non-visible light, for example infrared light. Light source 115 can include a light bulb, light emitting diode (LED), or other type of light producing device known in the art. To reduce interference from other light sources or control devices, such as infrared remote controls, light source 115 may modulate its light output using any modulation or coding scheme known in the art. A switch or other control device 120 connects the light source 115 with the battery 110, thereby activating the light source 115. In an embodiment, the switch or control device 120 can be actuated by a button 125. In further embodiments, the switch or control device 120 can include a timer or motion sensor adapted to activate and/or deactivate the light source 115. For example, a user can activate the light source 115 by pressing the button 125. As an example, the light source 115 may then deactivate upon the release of the button 125, upon the expiration of a timer, upon the cessation of motion, or any combination of these events.

The output of light source 115 passes through optical system 130. In an embodiment, optical system 130 includes one or more lenses, filters, diffraction gratings, holographic optics, slides with patterns, and/or other optical elements. The optical system 130 disperses and/or encodes patterns on the light emitted from the light source 115 such that a receiver portion, discussed below, can identify the target point and/or its relative motion. Example patterns introduced by the optical system 130 include a linear or non-linear intensity gradient, a set of concentric rings, and a set of randomly or pseudo-randomly distributed dots or speckles. As discussed above, because embodiments of the light source 115 can emit non-visible light, the pattern projected by the sender portion 100 may or may not be visible to the user.

In general, the pattern projected by the sender portion 100 should be dispersed wide enough so that at typical user distances from the target area, at least a portion of the pattern covers one or more sensors of the receiver portion, discussed below, for all possible target points within the target area. For example, if the target area is the screen of a television set and the typical user environment is a user's living room, then the sender portion 100 should disperse the pattern enough to cover one or more sensors of the receiver portion at distances from the target area typical for television viewing.

In an embodiment, the sender portion 100 can be a standalone system. In other embodiments, the sender portion 100 can be incorporated into other types of control devices, such as an infrared remote control. In further embodiments, the light source 115 or an auxiliary light source, such as a low-power laser, provides a visual indicator of the target point to the user, for example by projecting a focused beam of visible light on the target point.

Figure 2:
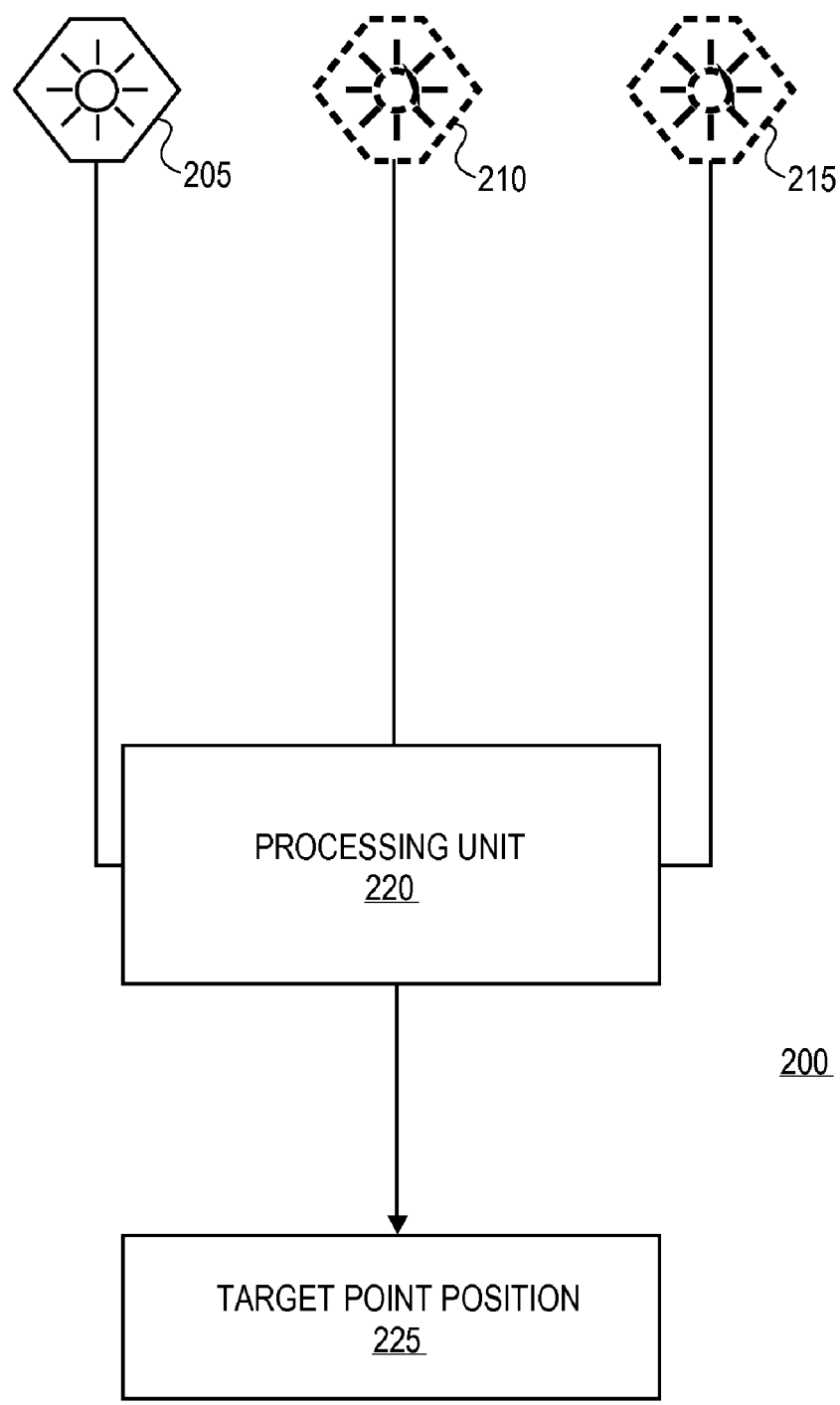
FIG. 2 illustrates a receiver portion of an embodiment of the invention.

FIG. 2 illustrates a receiver portion 200 of an embodiment of the invention. Receiver portion 200 includes sensor unit 205. Sensor unit 205 includes one or more sensors responsive to the light emitted from the light source 115 discussed above. In further embodiments, sensor unit 205 includes one or more filters, lenses, diffraction gratings, holographic optics, slides with patterns, and/or other optical elements adapted to help the sensors of sensor unit 205 to accurately detect the light emitted from light source 115 and to reduce interference from other light sources. The sensors of sensor unit 205 can be photo-electric devices, low resolution video cameras, or any other type of light-sensitive electronic device known in the art. In further embodiments, receiver portion 200 includes one or more additional sensor units similar to sensor unit 205, such as sensor units 210 and 215.

Processing unit 220 receives signals from sensor unit 205, and optionally sensor units 210, 215, and any other sensor units of the receiver portion 200. Processing unit 220 can be any type of information processing device capable of processing digital and/or analog information. Processing unit 220 evaluates these signals to determine if the user has specified a target point, and if so, the position of this target point. In an embodiment, the processing unit 220 is programmed with the physical configuration of the target area and the positions of the sensor units with respect to the target area, and uses this information in conjunction with the signals received from the sensor units to determine the position of the target point within the target area. As discussed in detail below, the one or more sensor units of an embodiment of the receiver portion 200 are positioned at the periphery of the target area in such a manner as to enable the receiver portion 200 to determine the target point specified by the user with the sender portion 100.

In an embodiment, processing unit 220 provides the position of the target point to a device connected with or including a display device. The device uses the location of the target point to position an on-screen pointer or other user interface element. Example devices can include televisions; DVD, Blu-Ray, HD-DVD, or other formats of video players and recorders; digital or personal video recorders; cable and satellite set-top boxes; and video game consoles. In an embodiment, the device receives the position of the target point via a wired or wireless data interface, such IEEE-1394 (e.g. Firewire or iLink), USB, Bluetooth, wireless USB, and wireless networking interfaces (e.g. 802.11). In another embodiment, all or part of the receiver portion 200 is integrated within the device connected with or including a display device. For example, a television set can include one or more sensor units around the periphery of the screen and a processing unit. In a further embodiment, the functions of the processing unit 220 are performed by one or more microprocessors or microcontrollers included in the device and that may also be used to implement other device functions.

Figure 3A:
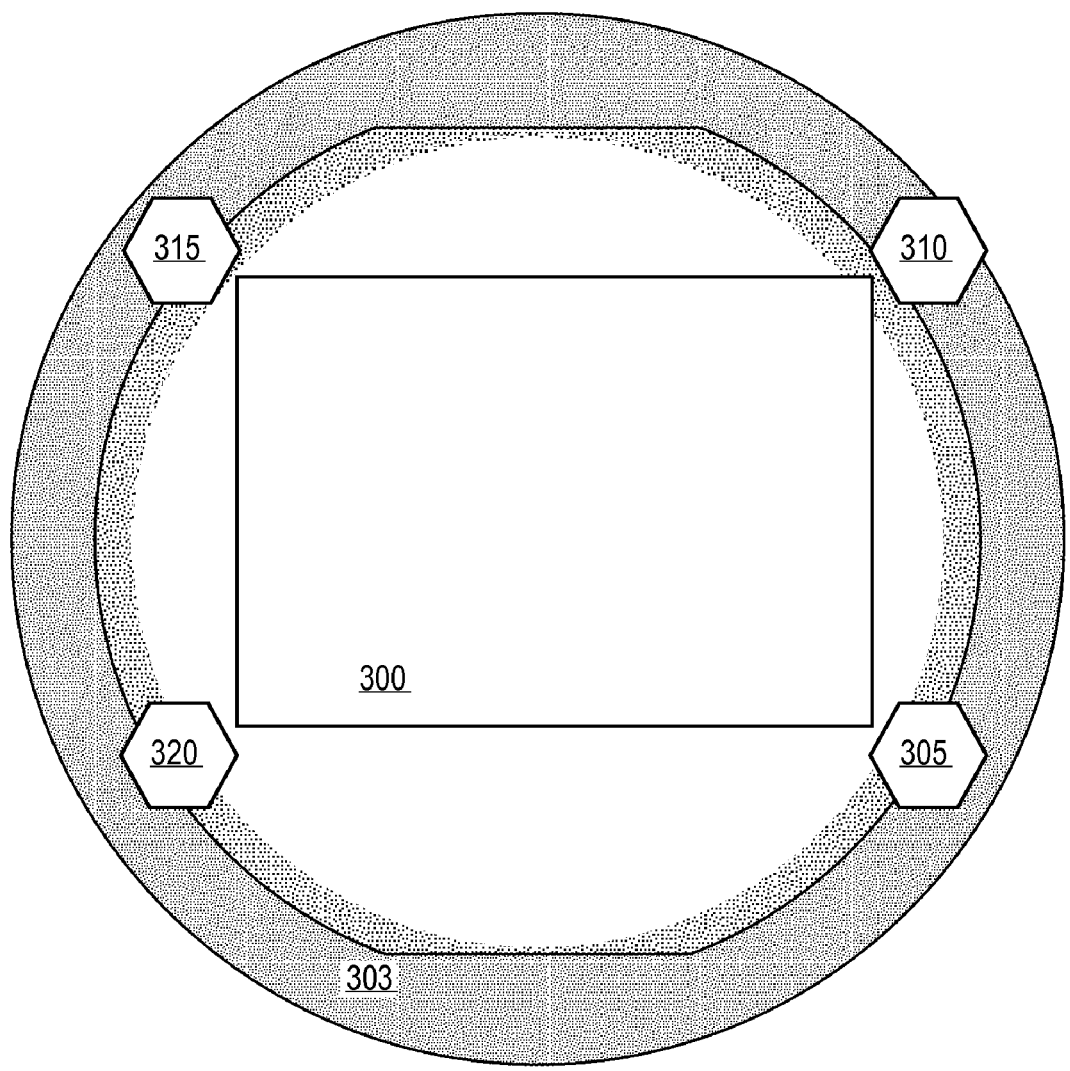
FIG. 3A-3B illustrates an example arrangement and operation of receiver sensors according to an embodiment of the invention.
Figure 3B:
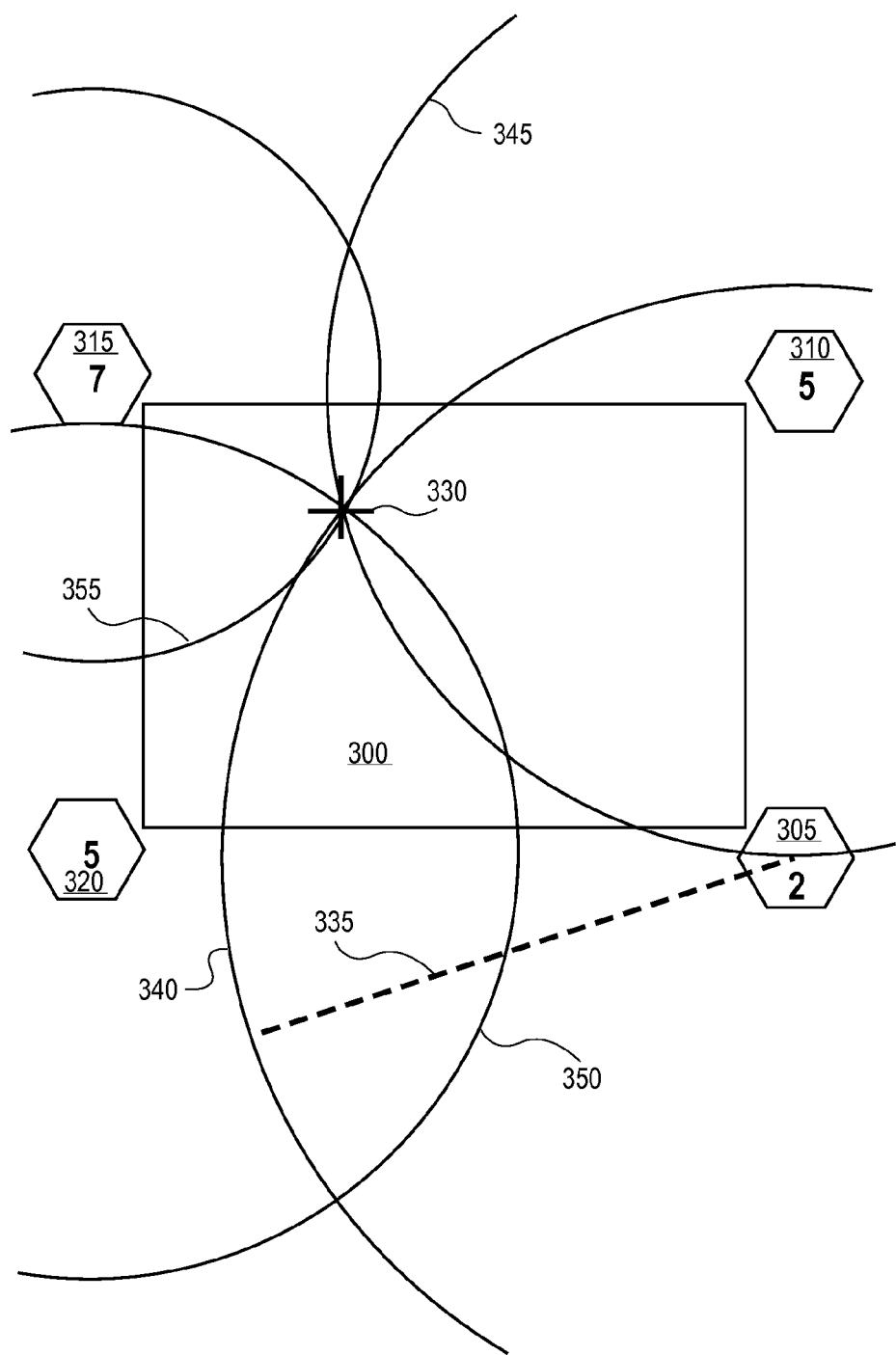

FIG. 3A-3B illustrates an example arrangement and operation of receiver sensors according to an embodiment of the invention. This embodiment is capable of providing an absolute position of the target point within a target area, or a relative motion of the target point from a previous position. In FIG. 3A, a target area 300, which can include the screen of a display device, is surrounded by four sensor units: 305, 310, 315, and 320. In alternate embodiments, additional sensor units can be included to improve performance and reduce interference from other light sources. The sender portion projects a pattern 303 on to the target area 300 and at least some of the sensor units.

FIG. 3B illustrates the determination of an example position of a target point according to an embodiment of the invention. The sender portion projects a pattern on to the target area 300 and the sensor units 305, 310, 315, and 320. The pattern is centered at the target point 330.

In an embodiment, the pattern 303 is a gradient pattern, in which the intensity of the light emitted from the sender portion decreases in proportion to the distance from the target point. To determine the position of the target point 330, an embodiment of the processing unit compares the intensity of the light from the pattern received by each of the sensor units. The processing unit transforms the light intensity value at each sensor unit into a distance value representing the distance from the sensor unit to the target point. For example, if the gradient pattern decreases intensity linearly from the center of the pattern, then the distance value is linearly proportional to the intensity value received by the sensor units. In other embodiments, the relationship between intensity and distance values may be non-linear, such as a logarithmic decay, to more accurately account for optical effects.

In an embodiment, by determining distance values for three or more sensor units, the processing unit can determine the location of the target point 330. FIG. 3B illustrates an example of this determination. In this example, sensor unit 305 receives an intensity value of 2 from the pattern projected by the sender portion. Based upon this intensity value, a distance value 335 is calculated. This distance value 335 defines a radius of circle 340. Circle 340 represents the set of possible positions of the target point based on the distance value 335. Similarly, sensor units 310 and 320 each receive an intensity value of 5, which correspond to circles 345 and 350. (In this example, it is assumed that the gradient pattern projected by the sender portion is brightest in the center, so that higher intensity values correspond to smaller distance values.) Sensor unit 315 receives an intensity value of 7, which corresponds to circle 355. In this example, the intersection of circles 340, 345, 350, and 355 specify the position of the target point 330.

In further embodiments, the processing unit determines an approximate position of the target point due to the margin of error in dispersing the pattern and measuring the intensity at each sensor unit. However, for many applications, determining an approximate position of the target point is adequate. If needed, additional sensor units, more precisely calibrated optics in the sender and receiver portions, different patterns, and/or more accurate sensors in the sensor units can reduce the margin of error.

In an additional embodiment, the intensity value received by one sensor unit is used as a reference value to determine the distance values associated with the other sensor units. For example, the highest or lowest intensity value received by any of the sensor units can be selected as a reference intensity value. The processing unit then scales the intensity values received from the remaining sensor units based on the reference intensity value and determines their distance values accordingly. By calculating distance from relative intensities, the processing unit compensates for the sender portion being located at varying distances from the receiver portion, for decreasing light output of the sender portion (for example due to battery wear), and other factors.

As discussed above, the processing unit can determine an absolute position of the target point by determining the intersection of the distance values from several sensor units. In a further embodiment, the processing unit can store one or more previously determined positions of the target point. These previously determined positions can be combined into a moving average or otherwise filtered to decrease small unwanted fluctuations in the position of the target point over time, such as those introduced by a user's unsteady hand, measurement error, and interference from other devices. Additionally, previously determined positions can be used to calculate the relative motion of the target point, rather than the absolute position.

Figure 4A:
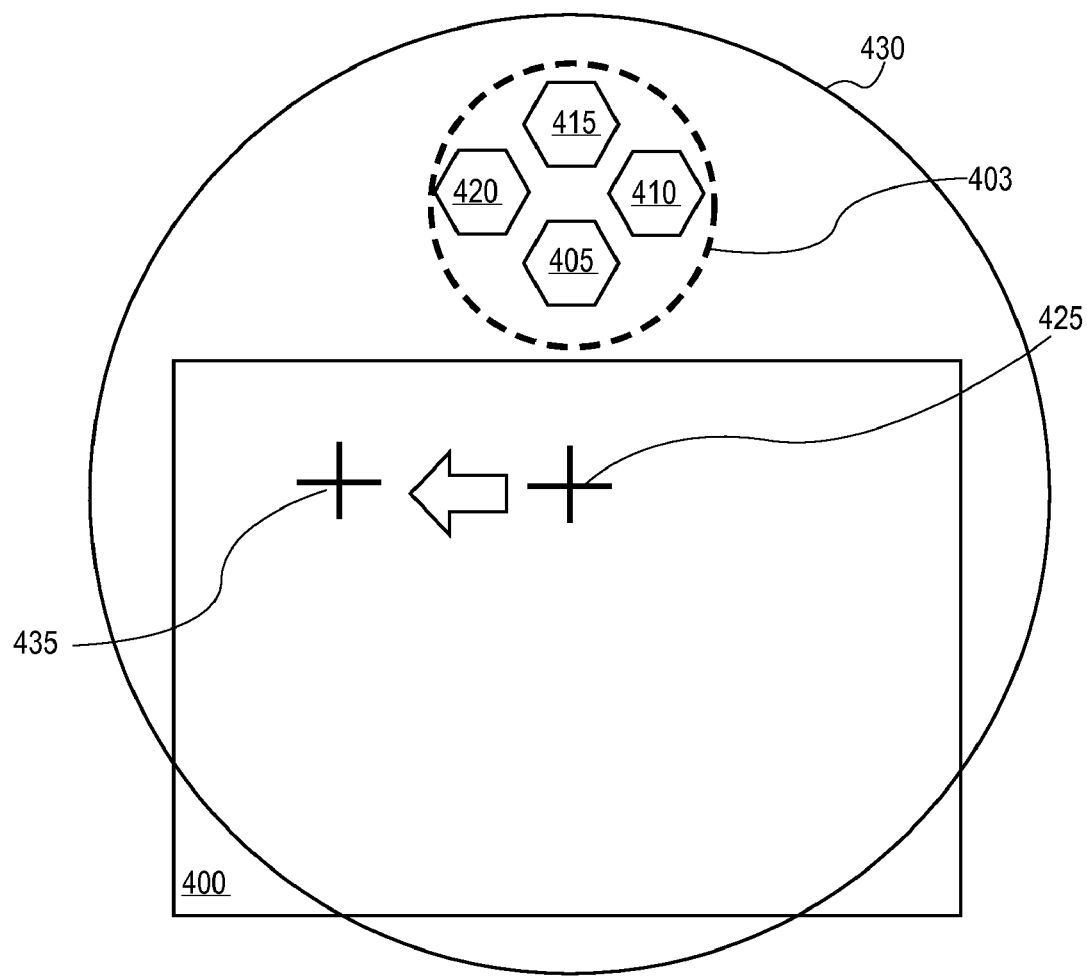
FIG. 4A-4C illustrates an example arrangement and operation of receiver sensors according to an embodiment of the invention.
Figure 4B:
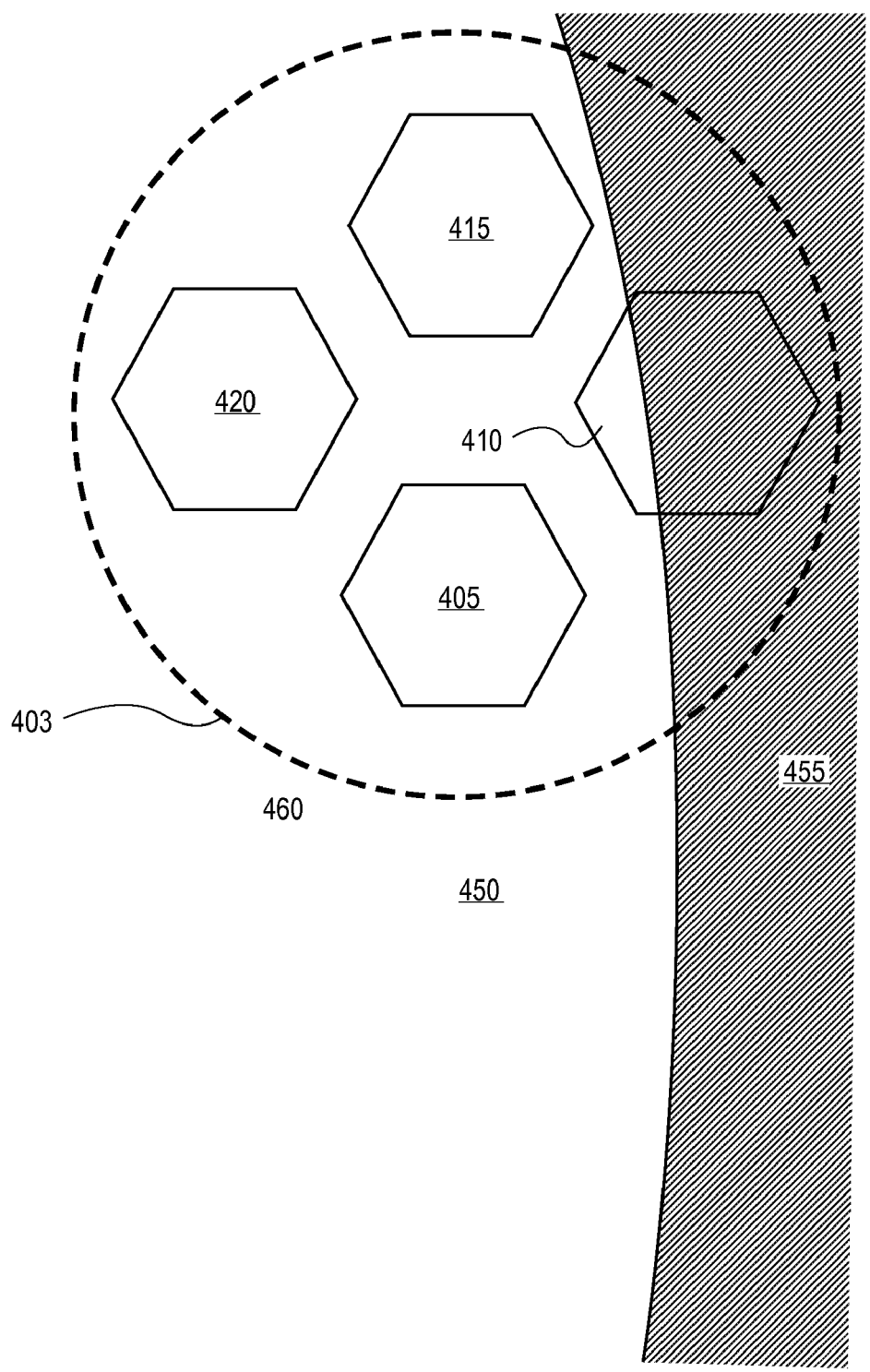
Figure 4C:
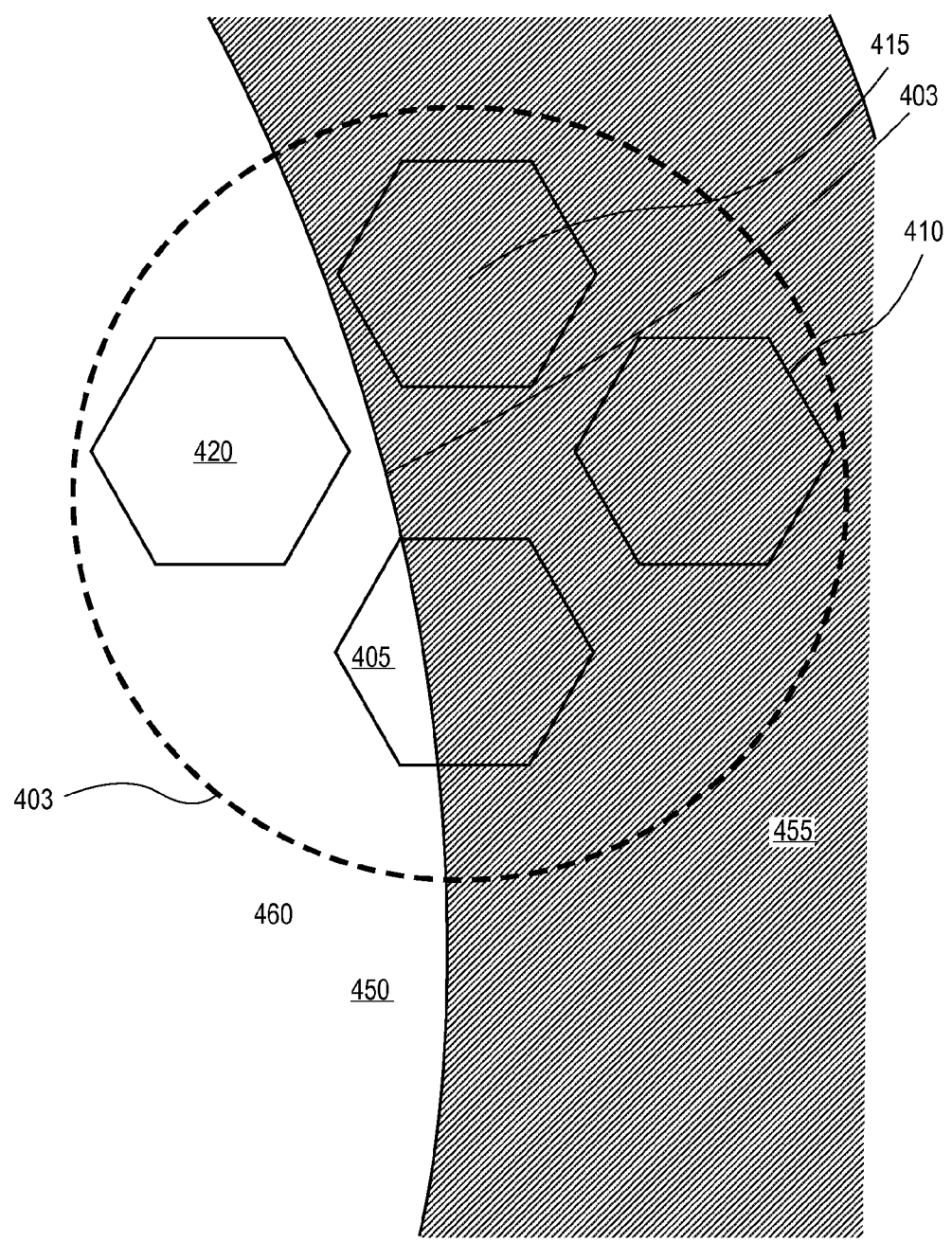

FIG. 4A-4C illustrates an example arrangement and operation of receiver sensors according to an embodiment of the invention. This embodiment is capable of providing a relative direction and quantity of motion of the target point within a target area. In FIG. 4A, a target area 400, which can include the screen of a display device, is surrounded by a sensor unit 403, which includes four individual sensors, 405, 410, 415, and 420, closely grouped together. In additional embodiments, there may be additional sensor units, each with multiple closely grouped sensors, positioned around the target area to improve performance and reduce interference from other light sources.

FIG. 4A illustrates the determination of the relative motion of a target point according to an embodiment of the invention. The sender portion projects a pattern 430 on to the target area 400 and the sensor unit 403 and its sensors 405, 410, 415, and 420. In this embodiment, the pattern 430 is centered at the location of the target point. In the example of FIGS. 4A-4C, the target point is initially located at position 425 and is gradually moved by the user to position 435.

In an embodiment, the pattern includes a set of concentric circles. As the pattern is moved across the target area, an embodiment of the processing unit detects the transitions between light and dark from the boundaries of the circles in the pattern. The number of transitions between light and dark is proportional to the magnitude of the relative motion of the target point. By comparing the timing of these transitions at two or more closely grouped sensors in the sensor unit 403, the processing unit can determine the direction of the relative motion. To accurately detect the direction of motion, the spacing between adjacent sensors in the sensor unit 403 should be smaller than the size of the circles, dots, or other elements of the pattern, when projected from typical user distances. This allows the processing unit to assume that transitions occurring at adjacent sensors in the sensor unit result from the same portion of the pattern. The number or density of circles in the pattern determines the relative sensitivity of this embodiment of the invention to the motion of the target point, with a higher density of circles in the pattern providing increased sensitivity.

In another embodiment, the pattern can include a set of randomly or pseudo-randomly distributed dots or speckles. Similar to the above embodiment, the processing unit detects transitions between light and dark as the pattern moves across the target area. As above, the number of transitions is proportional to the magnitude of the motion and the timing of transitions at closely grouped sensors in the sensor unit 403 specifies the direction of motion.

FIGS. 4B and 4C illustrate a portion of the pattern 430 as the target point is moved from position 425 to 435. In FIG. 4B, a portion 450 of pattern 430 is projected over the sensors 405, 410, 415, and 420 of the sensor unit 403. Portion 450 include a shaded area 455, such as a segment of a circle or a single dot in the pattern, and an unshaded area 460, such as the space between concentric circles or dots in the pattern. In the example of FIG. 4B, the shaded area 455 covers sensor 410, while sensors 405, 415, and 420 are in the unshaded area 460. In an embodiment, this configuration of the portion 450 of the pattern 430 is conveyed to the processing unit in the form of electrical signals from each sensor representing the amount of light received by each sensor.

FIG. 4C illustrates the change in position of the pattern as the target point moves from position 425 to position 435. In FIG. 4C, the portion 450 of pattern 430 has shifted to the left as a result of the movement of the target point. As a result, sensors 405 and 415 are now in the shaded area 455, rather than the unshaded area 460. The processing unit detects the transition of sensors 405 and 415 from the unshaded area 460 to the shaded area 455. These detected transitions indicate a movement of the target point by an amount proportional to the size of pattern features, such as the thickness of each circle or diameter of a dot or speckle. By comparing the timing of the transitions, the processing unit can determine the direction of pattern motion. For example, because sensor 410 transitioned to the shaded area 455 prior to sensors 405 and 415, the processing unit can determine that the pattern is moving from right to left. By arranging the sensors of the sensor unit appropriately, for example as shown in FIGS. 4A-4C, the processing unit can detect pattern transitions resulting from pattern motion along the horizontal and vertical axis, as well as any combination thereof.

Figure 5:
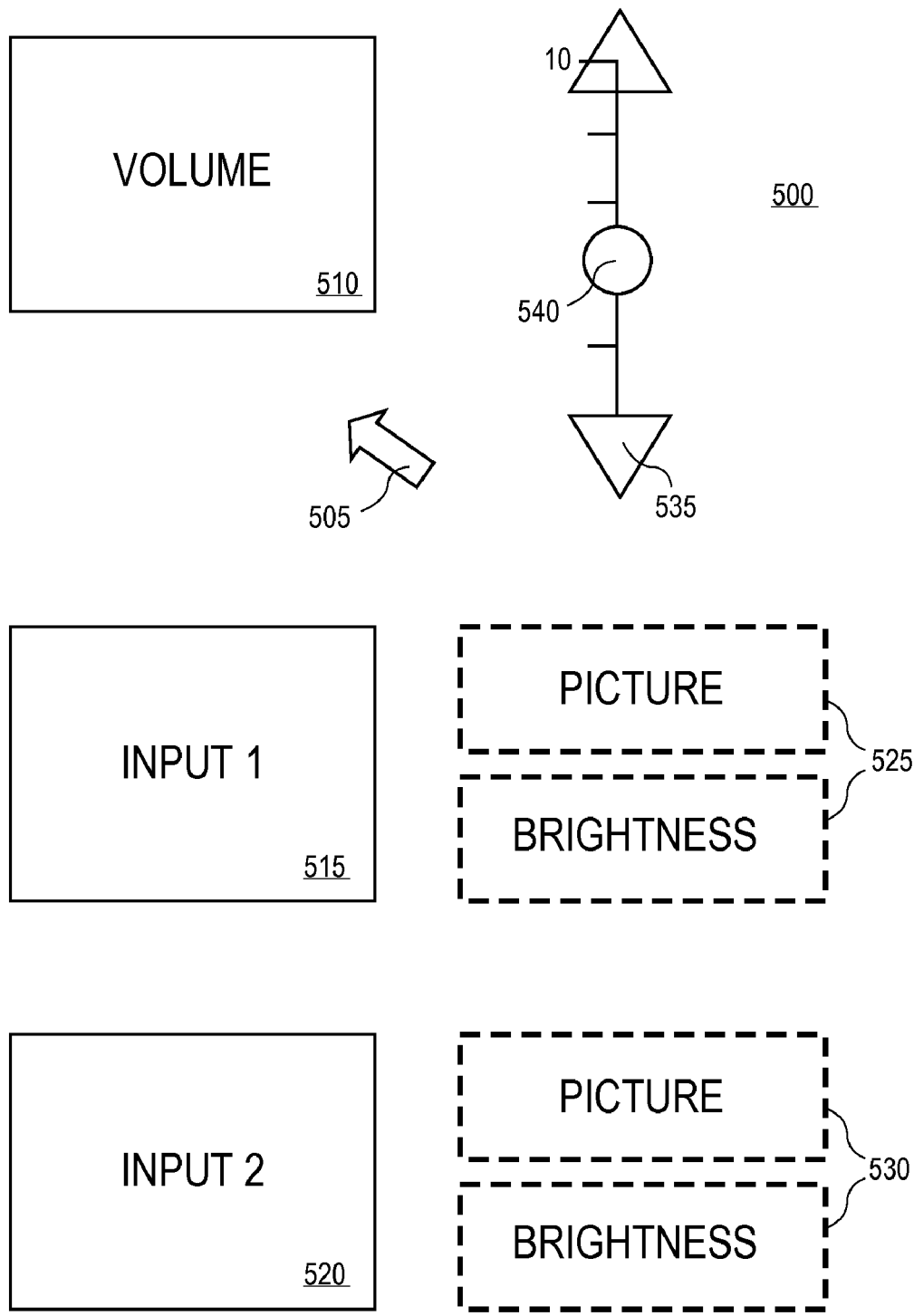
FIG. 5 illustrates an example on-screen graphical user interface according to an embodiment of the invention.

FIG. 5 illustrates an example on-screen graphical user interface 500 according to an embodiment of the invention. Interface 500 displays a pointer 505. The position of pointer 505 can be specified as an absolute position by the above-described absolute positioning embodiments. Alternatively, the pointer can be positioned at an initial default location and manipulated by the user using the above-described relative motion embodiments.

Interface 500 includes a set of icons including icons 510, 515, and 520. In an embodiment, icons represent functions of the display device or connected with the display device. For example, icon 510 controls the volume of audio and icons 515 and 520 control functions associated with different audio or video inputs of the device. In an embodiment, a user manipulates the sender portion discussed above to position the pointer 505 over an icon, thereby selecting the icon. In a further embodiment, the user presses a button on the sender portion to indicate that a selection is complete. The sender portion can modulate an additional control signal onto the light emitted from the light source to communicate this indication to the receiver portion. Embodiments of the sender portion can include one or more buttons or other control inputs for operating the example interface 500. Alternatively, the user can deactivate the light source of the sender portion, for example by releasing a button, to indicate a selection.

In a further embodiment, upon selecting an icon of the interface 500 using the pointer, one or more additional icons can be displayed to provide additional functions related to the previously selected icon. For example, interface 500 displays icon sets 525 and 530 when the user selects icons 515 or 520, respectively. For example, icon sets 525 and 530 enable adjustments to the picture and brightness settings of their associated inputs. In a further embodiment, the user can manipulate "virtual controls" intended to resemble physical buttons, switches, sliders, knobs, or other types of controls. Example virtual control 535 is a slider switch that can be manipulated by the user to adjust the value of a device parameter. In an embodiment, a user can manipulate the example virtual control 535 by selecting knob 540 with the pointer 505 and dragging the knob 540 to the desired position. In another embodiment, the selecting a related icon, for example icon 510, automatically maps any subsequent changes in target point position to the virtual control until the user indicates his or her selection is complete.

The embodiments discussed above provides users with an intuitive pointing capability capable of operating in free space without a flat surface. The sender portion does not require expensive or complicated electronics, and thus can be provided to users for a nominal cost. Furthermore, light sources suitable for implementing embodiments of the invention, such as LEDs, typically consume very little power. The sender and receiver portions do not depend on a signal from the display device to determine the position of a target point, and thus can operate with any type of display technology, including LCD, CRT, plasma, and DLP, LCOS, and other types of projection displays. The receiver portion can be integrated into a wide-variety of different types of devices. Furthermore, the processing requirements for the receiver portion are very low, enabling these functions to be implementing using relatively simple microprocessors or microcontrollers, which can be dedicated solely to these functions or implement additional functions of the device.

Further embodiments can be envisioned to one of ordinary skill in the art after reading the attached documents. For example, the gradient pattern and speckle or concentric circle patterns can be combined to provide an absolute positioning means and redundant means of determining relative motion. This embodiment can provide users with coarse absolute positioning of the pointer and very fine control of the relative motion of the pointer. In additional embodiments the sender portion can be integrated with other types of controls, such as remote controls, wired or wireless game pad or joysticks, cell phones, personal digital assistants (PDA) and handheld computers, laser pointers, or any other type of electronic device capable of being carried by a person. Additionally, the receiver portion can be integrated into the display device, a device providing a display signal to a display device, or a device providing an interface control signal to a control interface of a display device or any device providing display signal to a display device. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system for providing an input value to an electronic device, the system comprising:
   a light projecting device adapted to project a beam of light with an intensity pattern at a target area;
   a sensor unit adapted to measure a value of the intensity pattern of the beam of light at a location in the target area; and
   a processing unit having logic adapted to determine an input value associated with one of magnitude and direction of relative motion of the intensity pattern, the determination based at least in part on the value of the intensity pattern of the beam of light at the location in the target area.

2. The system of claim 1 wherein the intensity pattern includes a gradient pattern.

3. The system of claim 2 wherein the gradient pattern decreases intensity linearly from a center of the pattern.

4. The system of claim 2 wherein the gradient pattern decreases intensity logarithmically from a center of the pattern.

5. The system of claim 2 wherein the gradient pattern is overlaid with a concentric circle pattern such that an absolute target point position can be determined from the gradient pattern and relative motion can be redundantly determined from the concentric circle pattern.

6. The system of claim 1 wherein the intensity pattern includes a plurality of speckles.

7. The system of claim 1 wherein the light projecting device is further adapted to modulate the beam of light to reduce interference from other light sources, and wherein the sensor unit is adapted to demodulate the beam of light received by the sensor unit.

8. The system of claim 1 further comprising at least one other sensor unit adapted to measure a value of the intensity pattern of the beam of light at a location in the target area, the determination based at least in part on the value of the intensity pattern of the beam of light at the location in the target area.

9. The system of claim 8 wherein the sensor units are arranged along an axis.

10. The system of claim 1 wherein the logic is adapted to determine the input value by detecting a change in a presence of an intensity transition at the location in the target area.

11. The system of claim 1 wherein the logic is adapted to use a number of transitions between light and dark to calculate a magnitude of the input value.

12. The system of claim 1 wherein the determined input value includes both the magnitude and direction of relative motion of the intensity pattern.

13. The system of claim 1 further comprising logic to determine a target point within the target area.

14. The system of claim 1 wherein the system is integrated with a display device, the display device adapted to provide visual feedback to a user in response to the input value.

15. A method for providing an input value to an electronic device from a system comprising a light projecting device, a sensor unit, and a processing unit, the method comprising:
   projecting, from a light projecting device, a beam of light with an intensity pattern at a target area;
   measuring, by a sensor unit, a value of the intensity pattern of the beam of light at a location in the target area; and
   determining, using a processing unit, an input value associated with one of magnitude and direction of relative motion of the intensity pattern, the determining based at least in part on the value of the intensity pattern of the beam of light at the location in the target area.

16. The method of claim 15 wherein the intensity pattern includes a gradient pattern which is overlaid with a concentric circle pattern, the method further comprising:
   determining an absolute target point position from the gradient pattern; and
   determining relative motion from the concentric circle pattern.

17. The method of claim 15 further comprising determining a target point within the target area.

18. A system for determining motion of an input device, the system comprising:
   a sender portion adapted to project a pattern of light onto a target area, the pattern of light having light and dark elements; and
   a first sensor and a second sensor in the target area, the first and second sensors adapted to detect transitions between the light and dark elements as the pattern of light is moved across the target area;
   wherein a direction of motion is determined by comparing timing of the transitions between the first and second sensors without need for first determining a target position.

19. The system of claim 18 wherein a magnitude of motion is determined by the number of light and dark transitions detected over time.

20. The system of claim 18 wherein the sensors are spaced closer than the dark elements as projected onto the target are.

* * * * *